Figure 1:
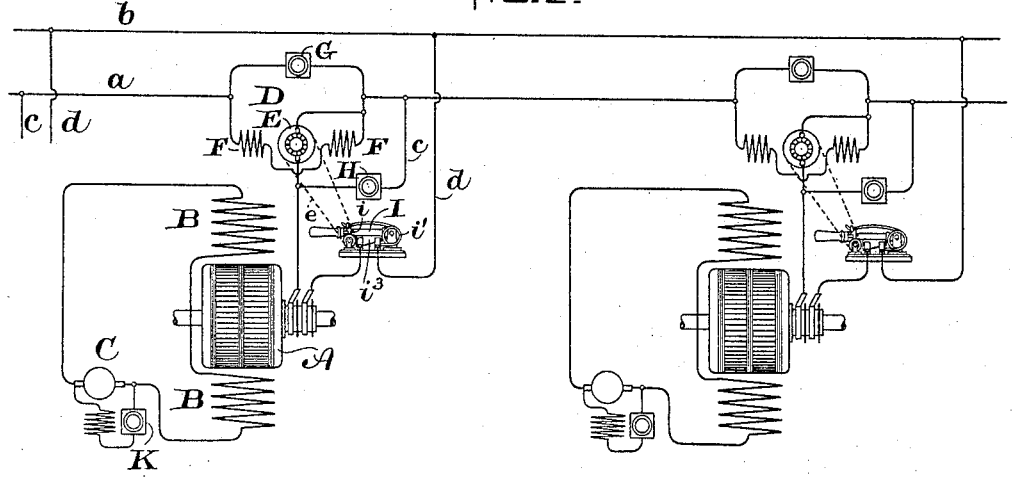

(No Model.)

H. F. PARSHALL.
AUTOMATIC CUT-OUT.

No. 567,608. Patented Sept. 15, 1896.

WITNESSES
A. S. Abell.
A. S. Macdonald.

INVENTOR.
Horace F. Parshall,
Geo. R. Blodgett,
atty.

UNITED STATES PATENT OFFICE.

HORACE F. PARSHALL, OF LONDON, ENGLAND, ASSIGNOR TO THE GENERAL ELECTRIC COMPANY, OF NEW YORK.

AUTOMATIC CUT-OUT.

SPECIFICATION forming part of Letters Patent No. 567,608, dated September 15, 1896.

Application filed July 18, 1896. Serial No. 599,696. (No model.)

*To all whom it may concern:*

Be it known that I, HORACE F. PARSHALL, a citizen of the United States, residing in London, England, have invented certain new and useful Improvements in Automatic Cut-Outs, of which the following is a specification.

My invention relates to the central-station control of dynamo-electric machines, and has for its object to obviate one of the difficulties attending this when a number of machines are operated in parallel upon a common circuit. Where machines are thus run, if the voltage of one falls below that of the others, the machine of lower voltage will take from the bus-bars a certain amount of current. The demand for this current falls upon the remaining machines which supply a higher electromotive force, and these machines must not only furnish sufficient current to burn the fuse of the lagging machine, but also must carry its load. This current is sufficient to burn the fuse of the machine or machines with higher electromotive force, and the result is, as has frequently been found in practice, that all of the machines are thrown out of action and there is temporary darkness until the fuses can be replaced.

The object of the present invention is to remedy the difficulty thus pointed out. For this purpose I provide in the circuit of each one of the machines connected in parallel a device inoperative so long as the machine is supplying current to the bus-bars, but which is called into action when the current in the leads of the machine is reversed, and which then opens a switch or cut-out and throws out of action the machine which is lagging. A small motor is utilized for this purpose, having on either its armature or field magnet a few turns of wire in series in the lead of the dynamo to be controlled. The other member of this motor is excited either directly from the bus-bar, or in the case of an alternating machine, by transformation from the bus-bars or external circuit. Ordinarily, as has been pointed out, the tendency of the motor is to rotate in a given direction, but this rotation is prevented by a stop. When the machine, however, takes current from the bus-bars, the motor reverses and opens a switch in the dynamo lead. This latter action may be direct or indirect, as by releasing a catch or by a power connection of any suitable type.

The device just described is also, as has been indicated, well adapted for use with alternating-current machines. In such machines it may be operated by a difference of phase between any machine and the current in the bus-bars or in the external circuit. As no modification is requisite in its application to alternators, it will be understood that in the description and claims its application to either form of machine is contemplated.

The accompanying drawings show diagrammatic embodiments of my invention. I have indicated in all of the drawings alternating-current machines, but this is unessential and is not to be taken as a limiting feature.

Figure 2:
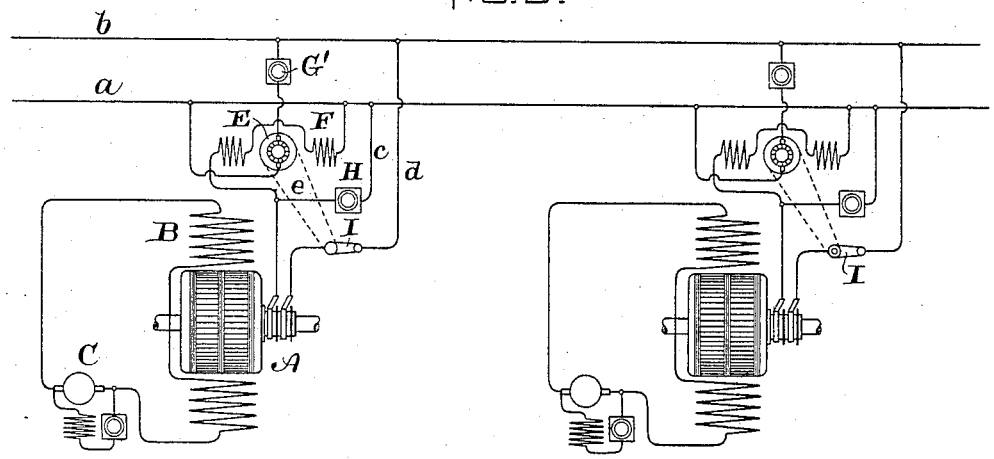
Figure 3:
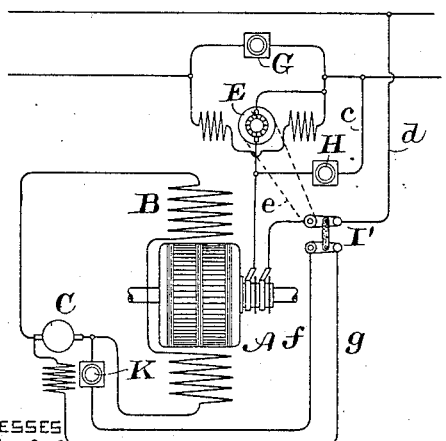

In the drawings, Figure 1 shows two machines in parallel, the armature of the motor being in the leads and its field in series with the bus-bar. In Fig. 2 the reverse arrangement is shown. In Fig. 3 a modification is shown in which not only the alternator main circuit but the circuit of the exciter is opened, and in Fig. 4 the armature of the motor device is supplied by transformation from the bus-bars.

A is the armature of the main machine; B B, its field-magnets, which are supplied from the exciter C, having the usual shunt-field and rheostat K in its circuit.

D is the motor device, comprising an armature E in series in the lead from the collector-ring of the main machine to the bus-bar and a field-magnet F in series in the bus-bar. The armature is shunted by a resistance H in the lead $c$, and the field is similarly shunted by a resistance G, so that the current may be regulated in the motor device, which may thus be smaller than if it were desired to carry the entire current of the machine and bus-bar, respectively. A suitable switching device or circuit-breaker I is automatically indicated, it being held closed by a latch $i$ and having a spring $i'$, serving, when the latch $i$ is released, to withdraw the switch-blade $i^3$ from the contacts and open the circuit of the lead $d$. A belt $e$ is shown in dotted lines communicating with the armature E, but this is a mere indication of any suitable form of power connection. The stop referred to in the statement of invention is shown at P.

Referring to Fig. 2, the same parts are indicated, but in this case the armature E of the motor device is in shunt across the bus-bars $a\ b$ and in series with the resistance G', the field-magnet F being in series with the lead from the alternator. The switch I is diagrammatically indicated in a different form.

In Fig. 3 the parts are as in Fig. 1, except that a double-pole switch I' is shown, serving to open the circuit not only of the lead $d$, but also the leads $f\ g$ of the exciter field-magnet circuit, thus throwing the exciter out of action when the main machine is cut out.

Figure 4:
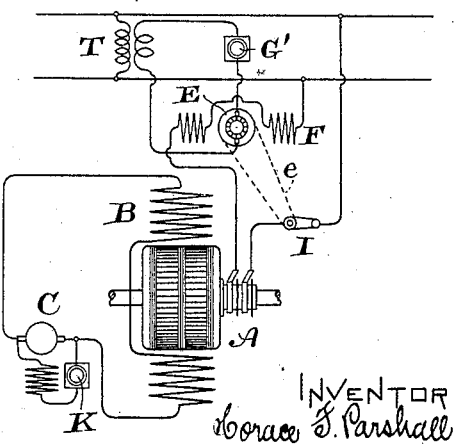

In Fig. 4 the parts are as shown in Fig. 2, except that the armature E is in this case supplied from the secondary of the transformer T, which is in shunt across the main.

In all of the figures the arrangements of armature and field-magnet of the motor device may be reversed, as will be readily understood, the essential feature of my invention being a motor device having a tendency normally to move in one direction, but having its motion automatically reversed by reversal of current in its lead, and a switching mechanism of any convenient type acting to open the circuit of the machine with which the motor device is connected, the two devices having a suitable power connection.

I have found that the arrangement just described is efficient in practice and convenient in installation.

What I claim as new, and desire to secure by Letters Patent of the United States, is—

1. An automatic cut-out for dynamo-electric machines comprising a motor device having one of its members in the main lead from the dynamo to the bus-bars, and its other member taking current from a distribution system external to the machine to be controlled, and a cut-out in one of the leads of such machine, the motor device and cut-out being mechanically connected.

2. An automatic cut-out for dynamo-electric machines operated in parallel, comprising a motor device having one of its members in series between the machine to be controlled and the bus-bars, and its other member taking current from the bus-bars, a switch acting to open the circuit of the machine to be controlled and also the circuit of the exciter, and a mechanical connection between the motor device and the switch.

3. An automatic cut-out for dynamo-electric machines operated in parallel, comprising a motor device consisting of a rotating armature in series between the machine to be controlled and the bus-bar, a field-magnet in series in the external circuit, the rotation of the armature being normally in a given direction, a stop to prevent rotation in that direction, a switching mechanism acting to cut out the main machine, and a mechanical connection between the rotating armature and the switching device; the whole being brought into operation by a reversal of current in the lead from the bus-bar to the main machine.

In witness whereof I have hereunto set my hand this 3d day of July, 1896.

HORACE F. PARSHALL.

Witnesses:
A. K. BAYLOR,
E. W. JOB.